United States Patent
Fukumoto et al.

(10) Patent No.: US 7,574,122 B2
(45) Date of Patent: Aug. 11, 2009

(54) IMAGE STABILIZING DEVICE

(75) Inventors: Shinpei Fukumoto, Neyagawa (JP); Hiroshi Kano, Kyotanabe (JP); Haruo Hatanaka, Kyoto (JP); Yutaka Kawamoto, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 448 days.

(21) Appl. No.: 11/439,969

(22) Filed: May 25, 2006

(65) Prior Publication Data
US 2006/0291841 A1 Dec. 28, 2006

(30) Foreign Application Priority Data
May 26, 2005 (JP) ............................ 2005-153759

(51) Int. Cl.
*G03B 17/00* (2006.01)
(52) U.S. Cl. ...................... 396/55; 396/421; 348/208.99
(58) Field of Classification Search ............. 396/52–55, 396/421; 73/570; 352/53; 348/208.99, 341, 348/239, 208.1, 208.2, 208.5, 208.6, 208.4, 348/281, E5.046
See application file for complete search history.

(56) References Cited

U.S. PATENT DOCUMENTS 6,556,784 B2 * 4/2003 Onuki ......................... 396/52
7,224,893 B2 * 5/2007 Uenaka ....................... 396/55

FOREIGN PATENT DOCUMENTS

JP 2005-298300 10/2005

* cited by examiner

*Primary Examiner*—Reena Aurora
(74) *Attorney, Agent, or Firm*—NDQ&M Watchstone LLP

(57) ABSTRACT

An image stabilizing device has an image restoration processor configured to perform image restoration process for stabilizing hand movement included in an input image by using an image restoration filter created based on hand movement information, and an edge emphasizing processor configured to perform edge emphasizing process for emphasizing an edge of the input image. The image stabilizing device has a stabilization mode determiner configured to determine an image stabilization mode for stabilizing the input image based on a size of the hand movement created by the hand movement information. The image stabilization mode includes a first mode for performing the image restoration process, a second mode for performing the edge emphasizing process, and a third mode for performing none of the image restoration process and the edge emphasizing process.

6 Claims, 7 Drawing Sheets

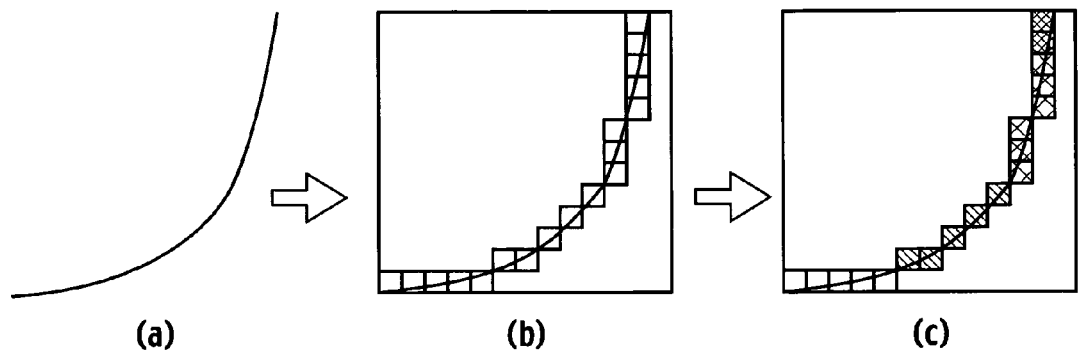
FIG. 6
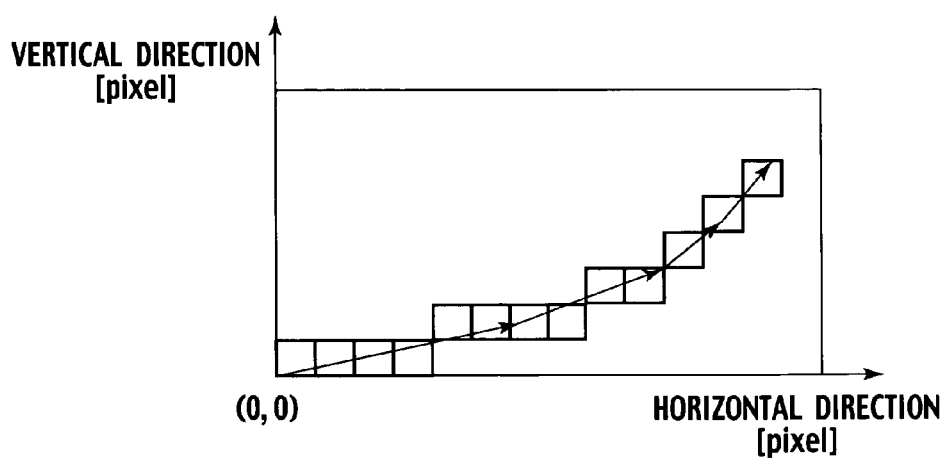
FIG. 7
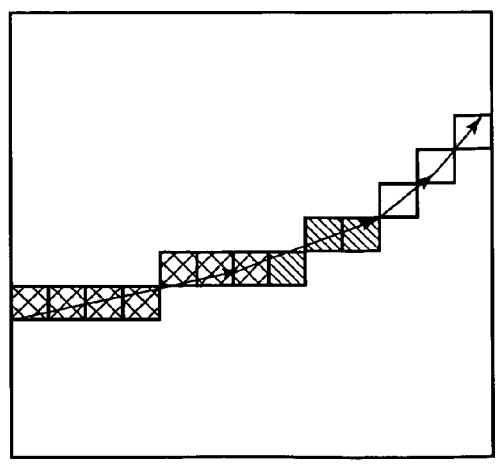

FIG. 8
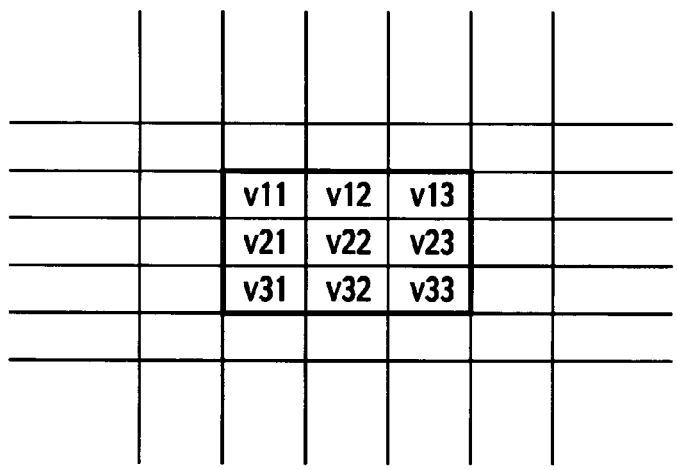
FIG. 9A
| 1 | 1 | 1 |
| 0 | 0 | 0 |
| -1 | -1 | -1 |
FIG. 9B
| 1 | 0 | -1 |
| 1 | 0 | -1 |
| 1 | 0 | -1 |
FIG. 10
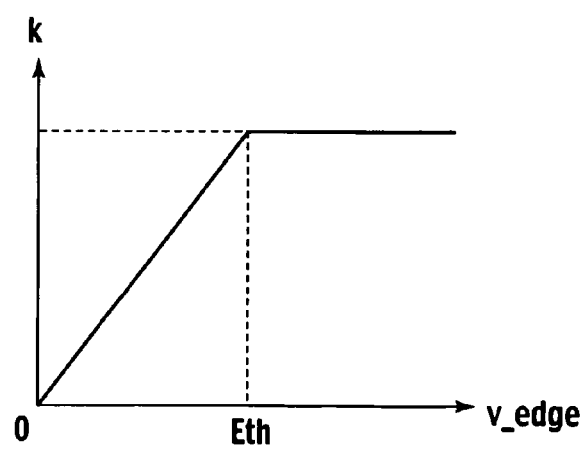

IMAGE STABILIZING DEVICE

CROSS REFERENCE TO RELATED APPLICATIONS

This application is based upon and claims the benefit of priority from prior Japanese Patent Application No. 2005-153759, filed on May 26; the entire contents of which are incorporated herein by reference.

BACKGROUND OF THE INVENTION

1. Filed of the Invention

The present invention relates to an image stabilizing device which is built in a digital camera or the like.

2. Description of the Related Art

An image stabilizing technique is a technique to stabilize (correct) inevitable hand movement caused at the time of photographing a still image. The image stabilizing technique is achieved by detecting the hand movement and stabilizing an image based on the detected result of the hand movement.

Methods for detecting the hand movement include a method using a hand movement sensor (an angular velocity sensor) and an electronic method for detecting the hand movement by analyzing the image. Methods for stabilizing the image include an optical method for stabilizing a lens and an imaging device and an electronic method for removing blur caused by the hand movement, by image processing.

On the other hand, a completely-electronic image stabilizing technique, that is, a technique in which only one photographed blurred image is analyzed and processed so as to create an image on which blurring is removed, has not reached at the level of practical use. In particular, it is difficult to obtain hand movement signals with accuracy obtained by the hand movement sensor by analyzing one blurred image.

Accordingly, it is practical that hand movement is detected by the hand movement sensor and blurring caused by the hand movement is removed by the image processing using the hand movement data. To remove blurring by the image processing is referred to as image restoration. In addition, a technique using the hand movement sensor and the image restoration is referred to as electronic image stabilizing herein.

A technique has been developed, in which data of the hand movement sensor is converted into Point Spread Function (PSF), which is a model representing deterioration of an image, which is caused by the hand movement, an image restoration filter is created from PSF, and an image is restored by means of this image restoration filter.

However, even though the hand movement can be accurately represented by PSF, hand movement stabilizing effects vary depending on a size of the hand movement, a trajectory shape of the hand movement, or the like. According to the size of the hand movement, the trajectory shape of the hand movement or the like, there is a case where the image stabilizing effect is low, or an image quality is adversely deteriorated when compared with that before the image stabilization.

In general, the image restoration filter is configured of a two-dimensional FIR filter. With the limitation of hardware, however, an upper limit of the size is fixed. When the size of the hand movement exceeds a certain constant value, components of the image restoration filter cannot be fit into the number of taps of the FIR filter. Therefore, the stabilizing effect becomes deteriorated. In contrast, when the size of the hand movement is extremely small, sufficient stabilizing effects can be obtained not by using the image restoration filter created from PSF, but even by using an unsharp masking filter.

In addition, even when the size of the hand movement is constant, the stabilizing effects may be changed depending on whether a speed change state of the hand movement is a uniform speed or non-uniform speed (acceleration, deceleration, and acceleration and deceleration). In case of the uniform speed, a specific frequency component is completely lost. Therefore, there exists the frequency component that cannot be restored by the image restoration filter. In addition, the number of the taps of the image restoration filter is prone to be larger when compared with the case of the non-uniform speed. Furthermore, ringing appears largely in the image restored by the image restoration filter. In addition, the stabilizing effects become smaller as the trajectory shape of the hand movement becomes complicated.

It should be noted that it is disclosed in Japanese Patent Laid-open Application No. Hei 7-226905 that detected blurring information is converted into PSF in consideration of an aperture curve of a sector.

In addition, it is disclosed in Japanese Patent Laid-open Application No. Hei 10-215405 that two points on an image are designated with a marker and an image is restored by convolution operation by using inclination and length thereof.

Furthermore, the following technique is disclosed in Japanese Patent Laid-open Application No. Hei 11-24122. That is, an angular velocity is obtained with integration of three periaxial angular accelerations obtained by three angular acceleration sensors. In addition, a change over time for aperture of shutter is detected. With the angular velocity and the aperture change over time, a transfer function (PSF) representing a blurring state at the time of photographing is created. The image is stabilized by performing inverse transformation of the transfer function in relation to the picked-up image.

In addition, it is disclosed in Japanese Patent Laid-open Application No. Hei 11-27574 that a picked-up image is converted into two-dimensional frequency space and a parameter of a direction and a size of hand movement are automatically detected.

Furthermore, it is disclosed in Japanese Patent Laid-open Application No. 2000-298300 that an hand movement vector in each pixel on a subject image is estimated and image stabilization according to the estimated hand movement vector is performed.

In addition, it is disclosed in Japanese Patent Laid-open Application No. 2004-88567 that hand movement information at the time of image pick-up is added to an image data and the image data is stabilized at the time of restoring the image data based on the added hand movement information.

SUMMARY OF THE INVENTION

One feature of the present invention is summarized in that an image stabilizing device provided with an image restoration processor for performing image restoration process for stabilizing (correcting) hand movement deterioration included in an input image by using an image restoration filter based on hand movement information and an edge emphasizing processor for performing edge emphasizing process for emphasizing an edge of the input image, is provided with a stabilization mode determiner for determining an image stabilization mode for stabilizing the input image based on a size of the hand movement created by the hand movement information, in which the image stabilization mode includes a first mode for performing the image restoration process, a second mode for performing the edge emphasizing process, and a third mode for performing none of the image restoration process and the edge emphasizing process.

According to such a feature, the stabilization mode determiner determines the image stabilization mode for stabilizing the input image based on the size of the hand movement created from the hand movement information. In addition to the first mode that the image restoration process is performed, the hand movement mode also includes a third mode that both of the image restoration process and the edge emphasizing process are not performed. Accordingly, it can be prevented that the image quality after the image stabilization is more deteriorated than the image quality before the image stabilization, and, at the same time, the effects of the image stabilization can be sufficiently obtained.

One feature of the present invention is summarized in that, in the above-described feature of the present invention, the first mode is the image stabilization mode that the edge emphasizing process is performed after the image restoration process is performed, and the second mode is the image stabilization mode that the edge emphasizing process is performed without performing the image restoration process.

One feature of the present invention is summarized in that, in the above-described feature of the present invention, the stabilization mode determiner determines the image stabilization mode based on trajectory information created from the hand movement information in addition to the size of the hand movement created from the hand movement information.

One feature of the present invention is summarized in that, in the above-described feature of the present invention, the stabilization mode determiner controls strength of stabilizing the hand movement by using the image restoration filter based on whether or not a speed change of the hand movement created from the hand movement information is uniform speed.

One feature of the present invention is summarized in that, in the above-described feature of the present invention, the image stabilizing device further includes a ringing remover for performing ringing removing process for removing ringing included in a stabilized image on which the hand movement is stabilized by the image restoration processor, in which the first mode is the image stabilization mode that the ringing removing process is performed after the image restoration process is performed, the third mode is the image stabilization mode that none of the ringing removing process, the image restoration process, and the edge emphasizing process is performed, and the stabilization mode determiner controls strength of removing the ringing based on whether or not a speed change of the hand movement created from the hand movement information is uniform speed.

One feature of the present invention is summarized in that, in the above-described feature of the present invention, the stabilization mode determiner determines the image stabilization mode by comparing the size of the hand movement with a predetermined threshold, and controls the predetermined threshold based on whether or not the speed change of the hand movement created from the hand movement information is uniform speed.

BRIEF DESCRIPTION OF THE DRAWINGS

FIG. 5 is a schematic diagram showing a spatial filter (PSF) representing hand movement;

FIG. 6 is a schematic diagram for describing Bresenham's straight line drawing algorithm;

FIG. 7 is a schematic diagram showing PSF obtained by motion vectors shown in FIG. 6;

FIG. 8 is a schematic diagram showing a 3×3 field centering a focused pixel v22;

FIG. 9 is a schematic diagram showing a Prewitt edge extract operator;

FIG. 10 is a graph showing a relation between an edge strength v_edge and a weighted mean coefficient k;

DETAILED DESCRIPTION OF THE EMBODIMENTS

An image stabilizing device according to one embodiment of the present invention will now be described below by referring to drawings. It should be noted that in one embodiment of the present invention, the image stabilizing device is applied for a digital camera.

(1) Configuration of Image Stabilizing Circuit

Figure 1:
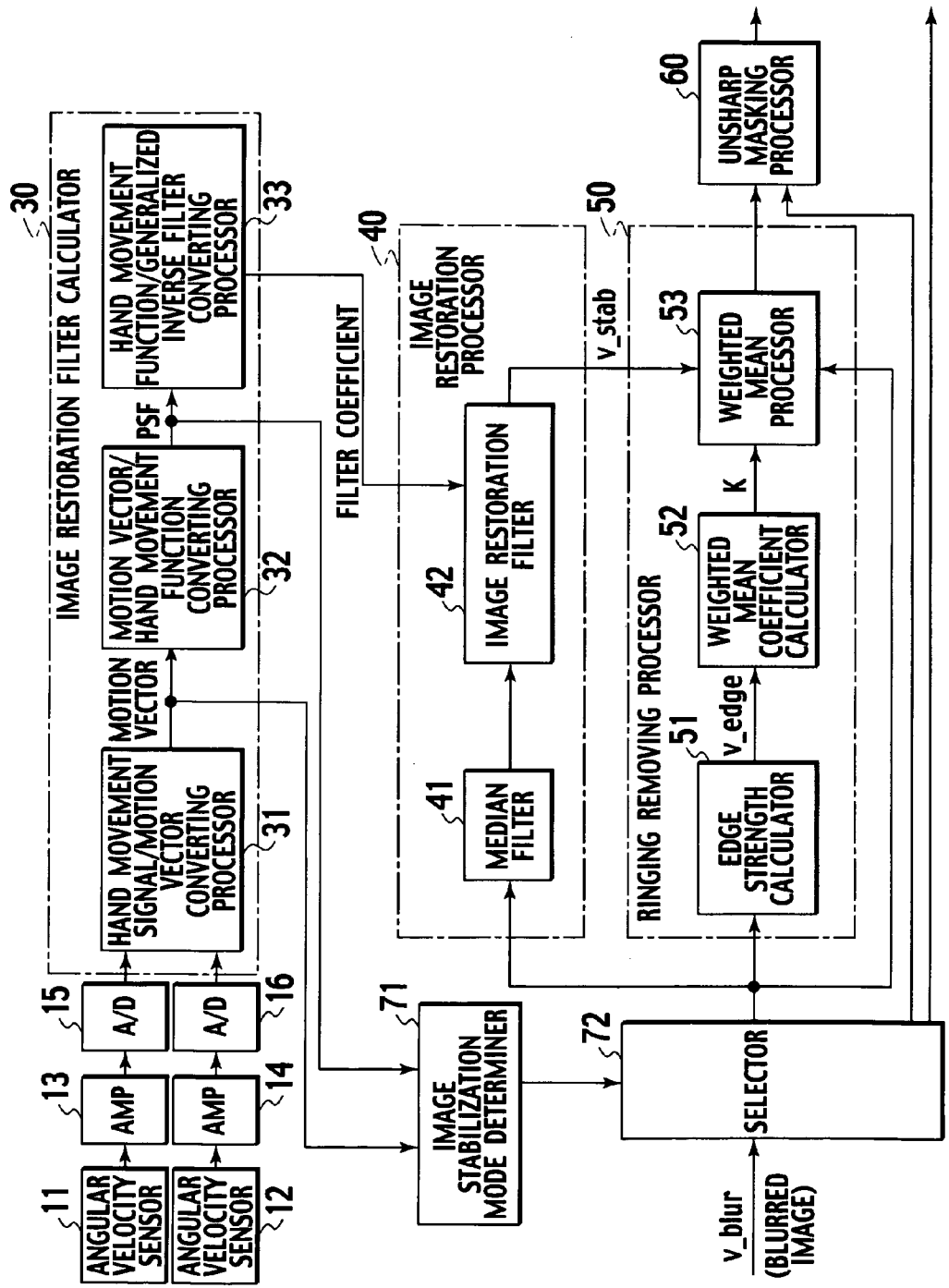
FIG. 1 is a block diagram showing a configuration of an image stabilizing circuit.

FIG. 1 shows a configuration of an image stabilizing circuit provided on a digital camera.

Angular velocity sensors 11 and 12 are provided for detecting an angular velocity of a camera (not shown) to pick up a subject. One angular sensor 11 detects an angular velocity in a pan direction of the camera, and the other angular velocity sensor 12 detects an angular velocity in a tilt direction of the camera. After output signals, which are output by the angular velocity sensors 11 and 12, are respectively amplified by amplifiers 13 and 14, output signals are respectively converted into digital data (the angular velocity data in the pan direction and the angular data in the tilt direction) by A/D converts 15 and 16.

The image stabilizing circuit is provide with an image restoration filter calculator 30, an image restoration processor 40, a ringing removing processor 50, an unsharp masking processor 60, an image stabilization mode determiner 71 (an image stabilization mode determiner), and a selector 72.

The image restoration filter calculator 30 calculates a coefficient of an image restoration filter (a generalized inverse filter) based on the angular velocity data in the pan direction and the angular velocity data in the tilt direction. The image restoration processor 40 performs image restoration process for stabilizing (correcting) hand movement included in a blurred image (v_blur), which is a picked-up image, based on the coefficient calculated by the image restoration filter calculator 30. The ringing removing processor 50 performs ringing removing process for removing ringing included in a stabilized image on which hand movement is stabilized (an restoration image) by the image restoration processor 40. The unsharp masking processor 60 performs edge emphasizing process for emphasizing an edge of a ringing-removed image on which the ringing is removed by the ringing removing processor 50, or an edge of the blurred image (v_blur).

The image stabilization mode determiner 71 determines an image stabilization mode, which is a mode for stabilizing (correcting) hand movement, based on a motion vector and PSF (Point Spread Function), which are obtained by the image restoration filter calculator 30. In addition, the image stabilization mode determiner 71 controls the selector 72 according to the determined image stabilization mode.

Here, the image stabilization mode includes a first mode, a second mode, and a third mode. Specifically, the first mode is the image stabilization mode, in which, after the image restoration process is performed, the ringing removing process and then the edge emphasizing process are sequentially performed. The second mode is the image stabilization mode that only the edge emphasizing process is performed without performing the image restoration process and the ringing removing process. The third mode is the image stabilization mode that none of the image restoration process, the ringing removing process, and the edge emphasizing process is performed.

The image stabilization mode determiner 71 controls the selector 72 so that the blurred image (v_blur) is transmitted to the image restoration processor 40 and the ringing removing processor 50 through the selector 72 when the image stabilization mode is determined as the first mode. In this manner, when the image stabilization mode is determined as the first mode, the image restoration process, the ringing removing process, and the edge emphasizing process are performed in this order by the image restoration processor 40, the ringing removing processor 50, and the unsharp masking processor 60, respectively, so that a stabilized image is created from the blurred image (v_blur).

The image stabilization mode determiner 71 controls the selector 72 so that the blurred image (v_blur) is transmitted to the unsharp masking processor 60 through the selector 72 when the image stabilization mode is determined as the second mode. In this manner, when the image stabilization mode is determined as the second mode, only the edge emphasizing process by the unsharp masking processor 60 is performed so as to create a stabilized image from the blurred image (v_blur).

The image stabilization mode determiner 71 controls the selector 72 so that the blurred image (v_blur) per se is output when the image stabilization mode is determined as the third mode. In this manner, when the image stabilization mode is determined as the third mode, none of the image restoration process, the ringing removing process, and the edge emphasizing process is performed.

(2) Image Restoration Filter Calculator 30

The image restoration filter calculator 30 is provided with an hand movement signal/motion vector converting processor 31 for converting the angular velocity data (the hand movement signals), which are detected by the angular velocity sensors 11 and 12, into a motion vector, a motion vector/hand movement function converting processor 32 for converting the motion vector, which is obtained by the hand movement signal/motion vector converting processor 31, into an hand movement function, and an hand movement function/ generalized inverse filter converting processor 33 for converting the hand movement function, which is obtained by the motion vector/hand movement function converting processor 32, into a generalized inverse filter (an image restoration filter). It should be noted that the hand movement function is a function representing an image blur, which is, for example, an image deterioration function (PSF: Point Spread Function).

(2-1) Hand Movement Signal/Motion Vector Converting Processor 31

Hand movement signals are signals, which are output from the angular velocity sensors 11 and 12 in the duration from the start to the end of photographing. In addition, hand movement data are data, which are digitized by the A/D converters 15 and 16 after the signals output from the angular velocity sensors 11 and 12 are amplified by the amplifiers 13 and 14. Specifically, the hand movement signal/motion vector converting processor 31 synchronizes the timing when the angular velocity sensors 11 and 12 start detection with the timing of camera exposure. At the same time, it obtains angular velocities in the pan direction and the tilt direction in a predetermined sampling interval dt [sec] so that the hand movement data from the start to the end of photographing are obtained. The sampling interval dt [sec] is, for example, 1 msec.

Figure 2:
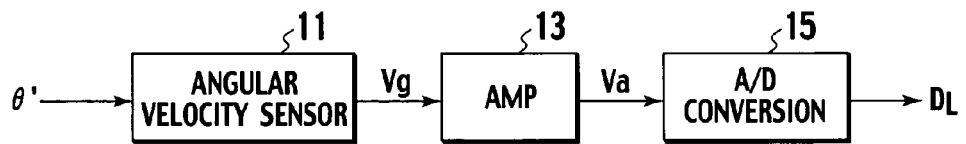
FIG. 2 is a block diagram showing an amplifier for amplifying an output of an angular velocity sensor and an A/D converter for converting the output of the amplifier into a digital value.

As shown in FIG. 2, for example, an angular velocity $\theta'$ [deg/sec] in the pan direction of a camera is amplified by the amplifier 13 after being converted into a voltage $V_g$ [mV] by the angular velocity sensor 11. A voltage $V_a$ [mV], which is output from the amplifier 13, is converted by the A/D converter 15 into a digital value $D_L$ [step]. The digital value $D_L$ [step] is converted into an angular velocity by using a sensor sensitivity S [mV/deg/sec], an amplifier magnification K [times], and an A/D converting coefficient L [mV/step].

The voltage value $V_g$ [mV], which is obtained by the angular velocity sensor 11, is proportional for a value of the angular velocity $\theta'$ [deg/sec]. The proportionality constant at this time is the sensor sensitivity S [mV/deg/sec]. Therefore, $V_g$ [mV] is represented by the following formula (1).

$$V_g = S\theta' \tag{1}$$

In addition, since the amplifier 13 only amplifies the voltage value $V_g$ [mV], the amplified voltage $V_a$ [mV] is represented by the following formula (2).

$$V_a = KV_g \tag{2}$$

The voltage value $V_g$ [mV], which is amplified by the amplifier 13, can be represented by a digital value $D_L$ [step] of n [step] (for example, −512 to 512) by being A/D converted. When the A/D converting coefficient is set to L [mV/step], the digital value $D_L$ [step] is represented by the following formula (3).

$$D_L = V_a/L \tag{3}$$

By using the above formulas (1) to (3), an angular velocity $\theta'$ can be calculated as shown in the following formula (4).

$$\theta' = (L/KS)D_L \tag{4}$$

With this, by using the angular velocities obtained in the duration from the start to the end of photographing, shaking amount created on the blurred image (v_blur) can be calculated. In addition, the shaking amount created on the blurred image (v_blur) is referred to as a motion vector.

An amount of a rotation of the camera in the duration from one sampling value of an angular velocity to a sampling value of the next angular velocity (the sampling interval dt [deg]) is set to $\theta$ [deg]. Here, when it is assumed that the camera rotates with a constant angular velocity within the sampling interval dt [sec] and a sampling frequency is f=1/dt [Hz], the rotation amount θ [deg] of the camera is represented by the following formula (5).

$$\theta = \theta'/f = (L/KSf)D_L \quad (5)$$

Figure 3:
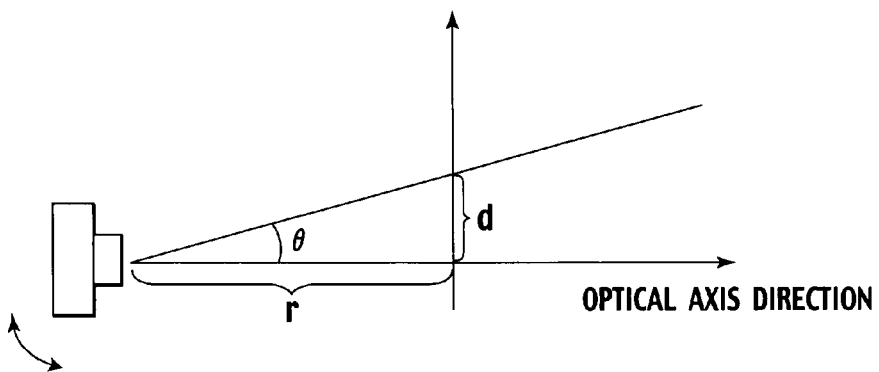
FIG. 3 is a schematic diagram showing a relation between a rotation amount θ [deg] of a camera and a shaking distance d [mm] on a screen.

As shown in FIG. 3, when r [mm] is set to a focal distance (in 35 [mm] film conversion), a shaking distance d [mm] on a screen is obtained from the rotation amount θ [deg] of the camera by the following formula (6).

$$d = r \tan \theta \quad (6)$$

The shaking distance d [mm] obtained here is a size of hand movement when converted to the 35 [mm] film and a unit is [mm]. When the calculation process is actually performed, the size of the image has to be considered by a unit [pixel] of an image of a digital camera.

Figure 4:
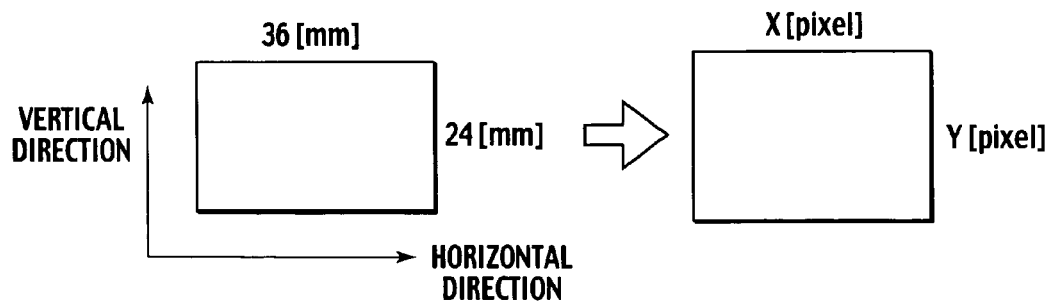
FIG. 4 is a schematic diagram showing an image size when converted into a 35 [mm] film and an image size of a digital camera.

Since the image converted to the 35 [mm] film and the image with [pixel] unit photographed by the digital camera are different in aspect ratio, the calculation is performed as follows. As shown in FIG. 4, the height and width of the image size is determined as 36 [mm] and 24 [mm] when converted to the 35 [mm] film. When it is assumed that the size of the image photographed by the digital camera is set to X [pixel] and Y [pixel], and blur in the horizontal direction (the pan direction) and blur in the vertical direction (the tilt direction) are set to x [pixel] and y [pixel], conversion formulas are to be the following formulas (7) and (8).

$$x = d_x(X/36) = r \tan \theta_x(X/36) \quad (7)$$

$$y = d_y(Y/24) = r \tan \theta_y(Y/24) \quad (8)$$

In the above-described formulas (7) and (8), subscripts x and y are used in d and θ, the subscript x indicates that it is a value in the horizontal direction and the subscript y indicates that it is a value in the vertical direction.

To summarize the above-described formulas (1) to (8), the blur x [pixel] in the horizontal direction and the blur y [pixel] in the vertical direction are represented by the following formulas (9) and (10).

$$x = r \tan \{(L/KSf)D_{Lx}\} X/36 \quad (9)$$

$$y = r \tan \{(L/KSf)D_{Ly}\} Y/24 \quad (10)$$

By using these conversion formulas (9) and (10), a blur amount (a motion vector) of the image can be obtained from the angular velocity data of the camera in each axis, which is obtained as a digital value.

The motion vector during photographing can be obtained to the number of the angular velocity data, which are obtained by the sensor (to the number of the sampling points). When these start points and the end points are sequentially connected, it becomes a trajectory of the hand movement on the image. In addition, by checking the size of each vector, the hand movement speed at that time can be obtained.

(2-2) Hand Movement Function/Generalized Inverse Filter Converting Processor 33

Hand movement can be expressed by using a spatial filter. When the spatial filter process is performed by weighting an element of an operator along with the trajectory of the hand movement shown in FIG. 5(a) (the trajectory that a certain one point depicts on an image when a camera shakes, and an image blur amount), a gray value of a pixel in the filtering process becomes to consider only the gray value of vicinity pixels according to the trajectory of the hand movement. Therefore, the blurred image can be created.

The operator, which is weighted along with this trajectory, is referred to as PSF (Point Spread Function). This PSF is used as a mathematical model of the hand movement. The weight of each element of PSF is a value, which is proportional to time when the trajectory of the hand movement passes through the element, and is a normalized value so that the total amount of the weight of each element becomes 1. In other words, it is set to a weight, which is proportional to an inverse of the size of the motion vector. It is because a motion vector, which moves slowly, gives a larger effect on an image when the effect of the hand movement on the image is considered.

FIG. 5(b) shows PSF in a case where the motion of hand movement is assumed to be uniform speed. FIG. 5(c) shows PSF in a case where the actual size of the motion of the hand movement is considered. In FIG. 5(c), the element whose PSF is light (the size of the motion vector is large) is shown in black, and the element whose PSF is heavy (the size of the motion vector is small) is shown in white.

The motion vector (the blurred amount of the image), which is obtained in the above (2-1), has the trajectory of the hand movement and the velocity of the trajectory as data.

To create PSF, a PSF element, which is weighted, is first determined from the trajectory of the hand movement. Then, the weight of PSF element is determined from the speed of the hand movement.

By connecting a series of the motion vectors, which are obtained in the above (2-1), the trajectory of the hand movement, which is broken line approximated, can be obtained. This trajectory has accuracy after the decimal point, but an element to be weighted in PSF is determined by causing this to be integer. Therefore, in the present embodiment, an element to be weighted in PSF is determined by using the Bresenham's straight line drawing algorithm. The Bresenham's straight line drawing algorithm is an algorithm for selecting optimal dot positions when it is wanted to draw a straight line passing through two arbitrary points on a digital screen.

The Bresenham's straight line drawing algorithm will be described by using an example of FIG. 6. In FIG. 6, a straight line with an arrow shows a motion vector.

(a) Starting from the origin (0, 0) of the dot position, an element in the horizontal direction of the motion vector is added.

(b) Checking the position in the vertical direction of the motion vector, an element in the vertical direction of the dot position is added when this position in the vertical direction becomes larger than 1 in comparison with the previous dot position in the vertical direction.

(c) Adding an element in the horizontal direction of the motion vector again.

By repeating such process to the end point of the motion vector, the straight line that the motion vectors pass can be expressed by the dot positions.

The weight to PSF element is determined by using the difference of the sizes of vectors between each motion vector. The weight takes the inverse of the size of the motion vector, and is substituted to an element corresponding to each motion vector. Note that the weight of each element is normalized so that the total weight of each element becomes 1. In FIG. 7, PSF obtained by the motion vectors in FIG. 6 is shown. The weight becomes small in a position where speed is fast (the motion vector is long) and the weight becomes large in a position where speed is slow (the motion vector is short).

(2-3) Motion Vector/Hand Movement Function Converting Processor 32

It is assumed that an image is digitized with resolution of $N_X$ pixel in the horizontal direction and $N_Y$ pixel in the vertical direction. The value of a pixel, which is positioned in the i-th pixel in the horizontal direction and the j-th pixel in the vertical direction, is shown by p(i, j). Image conversion by the spatial filter is to perform modeling of the conversion by convolution of vicinity pixels of the focused pixel. The convulsion coefficient is set to h(l, m). Here, for simplicity, when it is assumed that −n<l and m<n, the conversion of the focused pixel can be represented by the following formula (11). In addition, h(l, m) per se is referred to as a spatial filter or a filter coefficient. The characteristic of the conversion is determined by the coefficient value of h(l, m).

$$p'(i, j) = \sum_{l=-n}^{l=n} \sum_{m=-n}^{m=n} h(l, m) \times p(i+l, j+m) \qquad (11)$$

When a point light source is observed by an image pick-up device such as a digital camera, an image observed on a picture becomes such that only one point has a pixel value other than 0 and the other pixel values become 0 when it is assumed that there is no deterioration during image forming process. Since an actual image pick-up device includes deterioration in the process, even when the point light source is observed, the image does not become one point but an expanded image. When hand movement occurs, the point light source creates the trajectory according to the hand movement on a screen.

The spatial filter, which has a value proportional to the pixel value of the observed image in relation to the point light source as a coefficient and, in which the total of the coefficient values becomes 1, is referred to as PSF (Point Spread Function). In the present embodiment, PSF which is obtained by the motion vector/hand movement function converting processor 32, is used as PSF.

When PSF is modeled by the spatial filter h(l, m) with the height and width of (2n+1) and (2n+1) at −n<l and m<n, on each image, the relation between the pixel value p(i, j) of an image without blur and the pixel value p'(i, j) of an image with blur is represented by the above-described formula (11). Here, the pixel value p'(i, j) of the blurred image can be actually observed, and it is needed to calculate the pixel value p(i, j) of the image without blur in one way or another.

When the above-described formula (11) is written in relation to all the pixels, it becomes as the following formula (12).

$$p'(1, 1) = \sum_{l=-n}^{l=n} \sum_{m=-n}^{m=n} h(l, m) \times p(1+l, 1+m) \qquad (12)$$

$$p'(1, 2) = \sum_{l=-n}^{l=n} \sum_{m=-n}^{m=n} h(l, m) \times p(1+l, 2+m) \ldots$$

$$p'(1, N_n) = \sum_{l=-n}^{l=n} \sum_{m=-n}^{m=n} h(l, m) \times p(1+l, N_n+m)$$

$$p'(2, N_n) = \sum_{l=-n}^{l=n} \sum_{m=-n}^{m=n} h(l, m) \times p(2+l, N_n+m) \ldots$$

$$p'(N_y, N_n) = \sum_{l=-n}^{l=n} \sum_{m=-n}^{m=n} h(l, m) \times p(N_y+l, N_n+m)$$

These formulas can be collectively represented in matrix, and it becomes the following formula (13). Here, P is that an original image is unified in the order of raster scanning.

$$P'=H \times P \qquad (13)$$

If the inverse matrix $H^{-1}$ of H is present, an image without deterioration P could be obtained from a deteriorated image P' by calculating $P=H^{-1} \times P$, but the inverse matrix of H is generally not present. Contrary to a matrix having no inverse matrix, there is a general inverse matrix or a pseudo inverse matrix. In the following formula (14), an example of the general inverse matrix is shown.

$$H^*=(H^t \cdot H+\gamma \cdot I)^{-1} \cdot H^t \qquad (14)$$

where H* is the general inverse matrix of H, $H^t$ is a transposed matrix of H, γ is a scalar, I is a unit matrix having the same size with $H^t/H$. By calculation of the following formula (15) with H*, the image P in which is stabilized can be obtained from the observed blurred image P'. γ is a parameter (a normalizing coefficient) for adjusting the stabilization strength (image restoration strength). When γ is small, the stabilizing process is strengthened, and when γ is large, the stabilizing process is weakened.

$$P=H^* \times P' \qquad (15)$$

When the image size is set to 640×480, P in the above formula (15) becomes the matrix of 307,200×1, and H* becomes the matrix of 307, 200×307,200. Since the matrixes become extremely large as above, directly using the above formulas (14) and (15) is not practical. Therefore, it is possible to cause the size of the matrixes to be used for the calculation to be small with the following manner.

First, in the above formula (15), the image size, which is to be P, is set to a relatively small size such as 63×63. In case of the image with 63×63, P becomes the matrix of 3969×1, and H* becomes the matrix of 3969×3969. H* is the matrix for converting the entire blurred image into the entirely stabilized image, and the product of each line of H* and P corresponds to an operation for performing stabilization of each pixel. The product of the center line of H* and P corresponds to the stabilization in relation to the center pixel of the original image with 63×63 pixels. Since P is obtained by the original image unified in the order of the raster scanning, the spatial filter having the size of 63×63 can be configured by reversely causing the center line of H* to be two-dimensional with the inverse raster scanning. The spatial filter configured as such is referred to as a generalized inverse filter. The spatial filter having the practical size, which is created as above, is sequentially applied to each pixel of the entire large image so that the stabilization of the blurred image becomes possible.

(3) Image Restoration Processor 40

The image restoration processor 40 is, as shown in FIG. 1, provided with a filter circuit 41 for removing noise, and a filter circuit 42 for performing image restoration by using the image restoration filter. The filter circuit 41 performs filter process by using a median filter.

When the image stabilization mode is the first mode, the blurred image (v_blur) is transmitted by the camera through the selector 72 to the filter circuit 41 and filter process by the median filter is performed, so as to remove the noise. An image obtained by the filter circuit 41 is transmitted to the filter circuit 42 in which a filter coefficient is set by the image restoration filter calculator 30. In the filter circuit 42, the filter process using the image restoration filter is performed to restore a stabilized image, from the blurred image (v_blur).

The stabilized image (v_stab) obtained by the filter circuit 42 is transmitted to a weighted mean processor 53 in the ringing removing processor 50.

(4) Ringing Removing Processor 50

The ringing removing processor 50 is, as shown in FIG. 1, provided with an edge strength calculator 51, a weighted mean coefficient calculator 52 and a weighted mean processor 53.

When the image stabilization mode is the first mode, an image v_blur, which is photographed by the camera, is transmitted through the selector 72 to the edge strength calculator 51 and the weighted mean processor 53. In the edge strength calculator 51, edge strength is calculated for each pixel. How to obtain edge strength will be described.

As shown in FIG. 8, a 3×3 region centering a focused pixel v22 is assumed. In relation to the focused pixel v22, a horizontal edge component dh and a vertical edge component dv are calculated. For calculating the edge components, for example, the Prewitt edge extract operator shown in FIG. 9 is used. FIG. 9(*a*) shows a horizontal edge extract operator and FIG. 9(*b*) shows a vertical edge extract operator.

The horizontal edge component dh and the vertical edge component dv are obtained by the following formulas (16) and (17).

$$dh = v11 + v12 + v13 - v31 - v32 - v33 \quad (16)$$

$$dv = v11 + v21 + v31 - v13 - v23 - v33 \quad (17)$$

Next, the edge strength v_edge of the focused pixel v22 is calculated from the horizontal edge component dh and the vertical edge component dv based on the following formula (18).

$$v\_edge = sqrt(dh \times dh + dv \times dv) \quad (18)$$

It should be noted that as the edge strength v_edge of the focused pixel v22, asb(dh)+abs(dv) may be used. In addition, in relation to the edge strength obtained as above, a noise removing filter of 3×3 may be performed.

The edge strength of each pixel, which is calculated by the edge strength calculator 51, is given to the weighted mean coefficient calculator 52. The weighted mean coefficient calculator 52 calculates a weighted mean coefficient k of each pixel based on the following formula (19).

If $v\_edge > Eth$ then $k=1$

If $v\_edge \leq Eth$ then $k = v\_edge/Eth$ \quad (19)

where Eth is a parameter for adjusting a ringing removing strength. The relation between v_edge and a weighted mean coefficient k will be the relation as shown in FIG. 10.

The weighted mean coefficient k of each pixel, which is calculated by the weighed mean coefficient calculator 52, is given to the weighted mean processor 53. When a pixel value of the stabilized image (v_stab), which is obtained by the image restoration processor 40, is set to an image pixel (v_stab), and a pixel value of the blurred image (v_blur), which is photographed by the camera, is set to a pixel value (v_blur), the weighted mean processor 53 weights and means the pixel value (v_stab) of the stabilized image and the pixel value (v_blur) of the blurred image (v_blur) by performing the calculation represented by the following formula (20).

$$v = k \times v\_stab + (1-k) \times v\_blur \quad (20)$$

In other words, for a pixel whose edge strength is larger than the threshold Eth, the ringing of the restoration image corresponding to the position is not obvious. Therefore, the pixel value (v_stab) of the stabilized image (v_stab), which is obtained by the image restoration processor 40, per se is output. In case where the edge strength v_blur is smaller than the threshold Eth, as the edge strength v_edge is smaller, the ringing of the stabilized image (v_stab) becomes obvious. Therefore, the degree of the restoration image is weakened and the degree of the blurred image (v_blur) is strengthened.

When the threshold Eth becomes larger, the percentage of the blurred image (v_blur) becomes higher. Therefore, the effect of stabilizing (correcting) the hand movement becomes lower, but the ringing removing strength becomes higher. In contrast, when the threshold Eth becomes smaller, the percentage of the stabilized image (v_stab) becomes higher. Therefore, the effect of stabilizing (correcting) the hand movement becomes higher, but the ringing removing strength becomes lower.

(5) Unsharp Masking Processor 60

Unsharp masking is an image process means for performing edge emphasis. When the image stabilization mode is the first mode, an image, which is subjected to the ringing removing process by the ringing removing processor 50, is entered into the unsharp masking processor 60. When the image stabilization mode is the second mode, the blurred image (v_blur), which is photographed by the camera, is entered through the selector 72 into the unsharp masking processor 60.

The image, which is to be entered into the unsharp masking processor 60, is referred to as an original image. The unsharp masking processor 60 firstly creates a smoothed image by smoothing the original image by using a Gaussian filter, takes difference between the original image and the smoothed image, and multiplies the difference by a stabilization strength parameter to obtain an edge strength image. Then, the original image is added by the edge strength image to obtain an image whose edge is emphasized.

When the original image is set to I, and an image, which is obtained by the unsharp masking process, is set to I', I' is represented by the following formula (21).

$$I' = I + K(I - G(I)) \quad (21)$$

where G(I) is a smoothed image of the original image, and K is a stabilization strength parameter.

The image G(I) on which smoothing is performed by the Gaussian filter, is obtained by the convolution of the two-dimensional Gauss function, which is represented by the following formula (22), where mean is set to 0 and a dispersion is set to $\sigma^2$ in relation to the original image I(x, y).

$$F(x, y) = \frac{1}{2\pi\sigma^2} e^{-\frac{x^2+y^2}{2\sigma^2}} \quad (22)$$

In other words, G(I) is represented by the following formula (23).

$$G(I) = F(x,y) * I(x,y) = \int \int F(x+u, y+v) \cdot I(x,y) du dv \quad (23)$$

where signal * shows the convolution. The parameter σ showing dispersion becomes an adjusting parameter.

(6) Image Stabilization Mode Determiner 71

Figure 11:
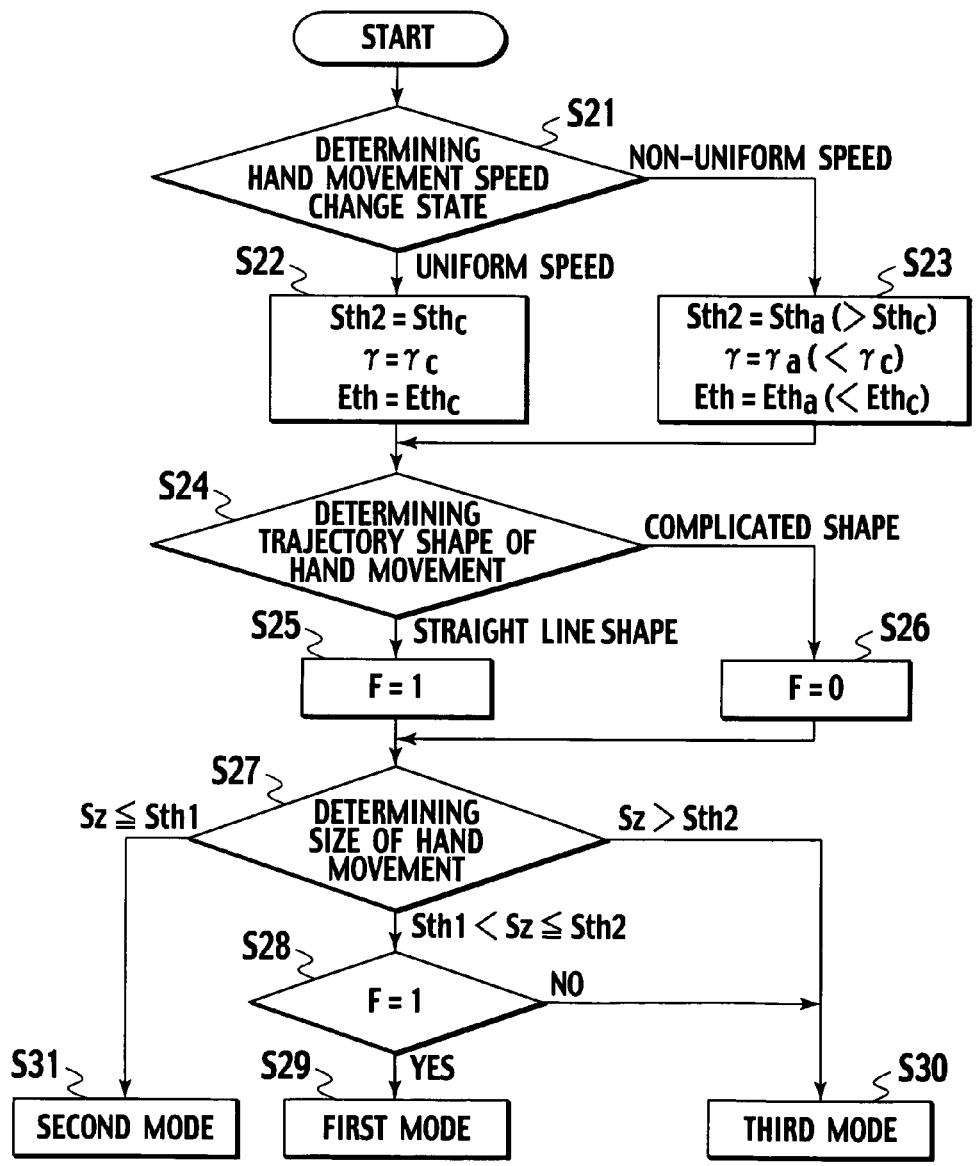
FIG. 11 is a flowchart showing stabilization mode determining process, which is performed by an image stabilization mode determiner 71.

FIG. 11 shows the procedure of stabilization mode determining process, which is performed by the image stabilization mode determiner 71.

The image stabilization mode determiner 71 determines an image stabilization mode based on a motion vector, which is obtained by the hand movement signal/motion vector converting processor 31, and PSF, which is created by the motion vector/hand movement function converting processor 32.

First, the determining process of a speed change state of hand movement is performed based on a size of the vector, which is obtained by the hand movement signal/motion vector converting processor 31 (Step S21). In other words, it is determined whether the speed change state of the hand movement is a uniform speed or non-uniform speed (acceleration, deceleration, and acceleration and deceleration).

As described above, the motion vector during photographing is obtained to the number of data of angular velocities (to the number of sampling points), which are obtained from the sensors. In the present embodiment, whether the speed change state of the hand movement is the uniform speed or non-uniform speed is determined based on whether or not a variation range Va of the size of the motion vector during photographing is smaller than a predetermined threshold Vth.

Figure 12:
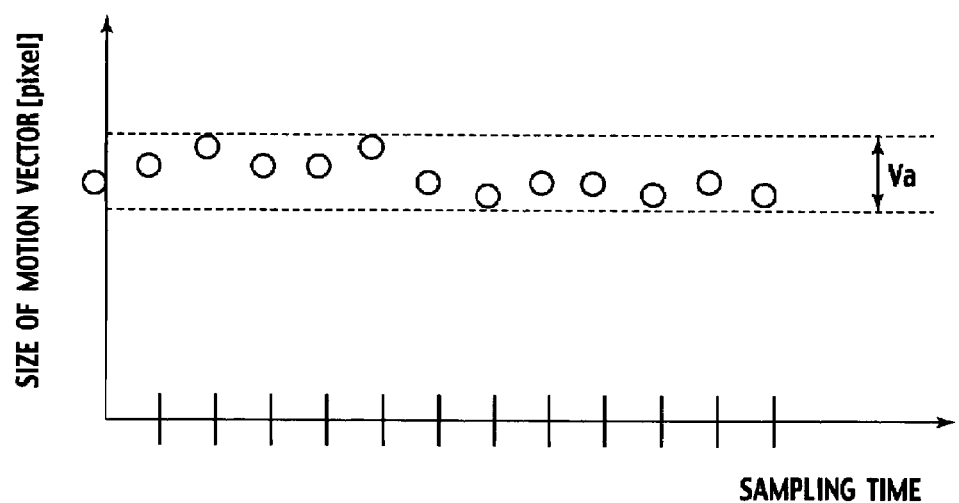
FIG. 12 is a graph showing an example of a case where an hand movement speed change state is determined as uniform speed.
Figure 13:
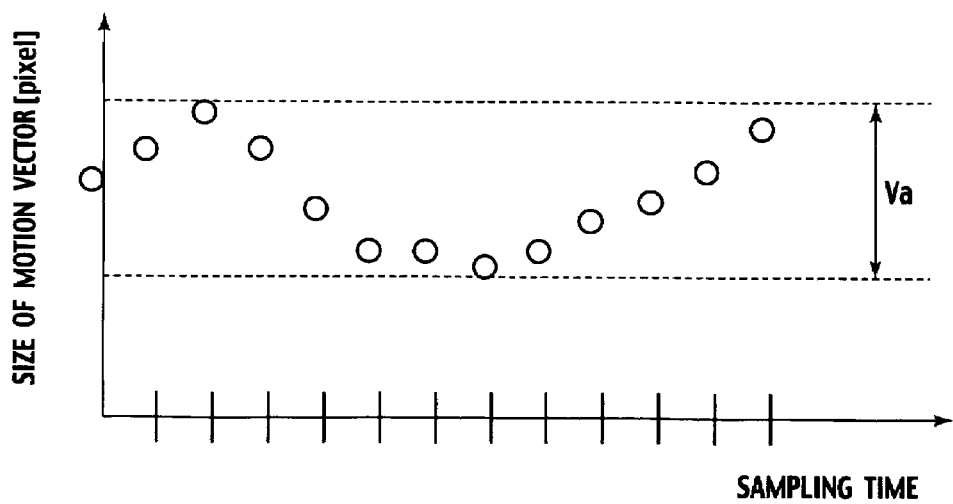
FIG. 13 is a graph showing an example of a case where the hand movement speed change state is determined as non-uniform speed.

As shown in FIG. 12, when the variation range Va of the size of the motion vector during photographing is smaller than the predetermined threshold Vth, it is determined that the speed change state of the hand movement is the uniform speed. As shown in FIG. 13, when the variation range Va of the size of the motion vector during photographing is larger than the predetermined threshold Vth, it is determined that the speed change state of the hand movement is non-uniform speed.

When the speed change state of the hand movement is determined as the uniform speed, a correctable hand movement size Sth2 used as a threshold in determining the size of the hand movement, which will be described later, is set to Sthc, a parameter γ (a normalizing coefficient), which is used in the hand movement function/generalized inverse filter converting processor 33 and adjusts the hand movement stabilization strength (see, the above-described formula (14)) is set to γc, and a parameter Eth for adjusting the ringing removing strength, which is used in the ringing removing processor 50, is set to Ethc, respectively (Step S22). Then, the step proceeds to Step S24.

When the speed change state of the hand movement is determined as non-uniform speed, the correctable hand movement size Sth2 is set to Stha, which is larger than Sthc, the parameter γ (see, the above-described formula (14)) for adjusting the hand movement stabilization strength (the image restoration strength) is set to γc, which is smaller than γa, and the parameter Eth for adjusting the ringing removing strength is set to Etha, which is smaller than Ethc (Step S23).

Then, the step proceeds to Step S24. These parameters are set to, for example, Sthc=17 [pixel], Stha=25 [pixel], γc=0.07, γa=0.05, Ethc=64, and Etha=32.

In other words, when the size of the hand movement becomes larger, the correctable hand movement size Sth2 is set to small since the image restoration by the image restoration filter becomes difficult. In addition, since negative effects due to the image restoration process becomes larger with the uniform speed, the normalizing coefficient γ is set to large in order to weaken the hand movement stabilization strength. In addition, since the ringing becomes larger with the uniform speed when the image restoration process is performed, Eth is set to large in order to strengthen the ringing removing strength.

At Step S24, the trajectory shape of the hand movement determining process is performed based on the direction of the motion vector, which is obtained by the hand movement signal/motion vector converting processor 31. In other words, it is determined whether the hand movement trajectory shape is a straight line shape or a complicated shape.

In the present embodiment, whether the trajectory shape of the hand movement is the straight line shape or complicated shape is determined based on whether or not a change more than a predetermined threshold θth is present by comparing the changes of the directions of the motion vectors during photographing (the angular changes of the motion vectors), which are temporally adjacent to one another, with a predetermined threshold θth.

Figure 14:
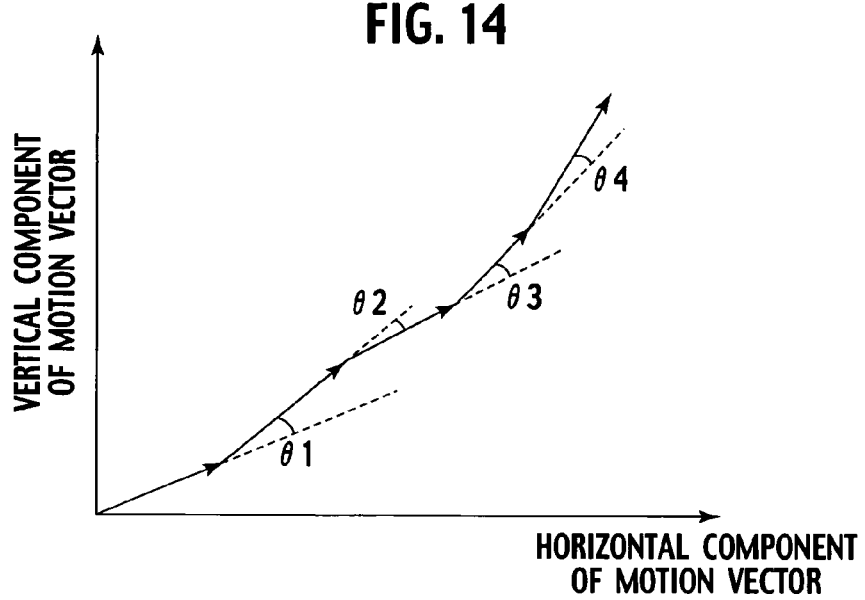
FIG. 14 is a graph showing an example of a case where a trajectory shape of the hand movement is determined as a straight line shape.
Figure 15:
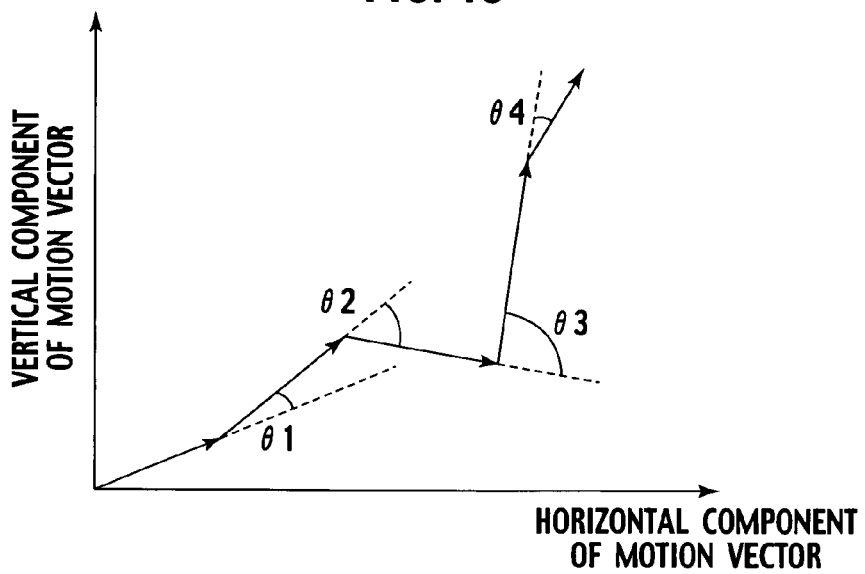
FIG. 15 is a graph showing and example of a case where the trajectory shape of the hand movement is determined as a complicated shape.

As shown in FIG. 14, when all of the changes (θ1 to θ4) in the directions of the motion vectors during photographing, which are temporally adjacent to one another, are smaller than the threshold θth, it is determined that the trajectory shape of the hand movement is a straight line shape. As shown in FIG. 15, when one or more of the change more than θth is present like θ2 and θ3 of the changes (θ1 to θ4) in the directions of the motion vectors during photographing, which are temporally adjacent to one another, it is determined that the trajectory shape of the hand movement is complicated shape.

When the trajectory shape of the hand movement is determined as straight line shape, the step proceeds to Step S27 after a flag F is set (F=1)(Step S25). When the trajectory shape of the hand movement is determined as complicated line, the step proceeds to Step S27 after the flag F is reset (F=0) (Step S26).

At Step S27, the sizes of the hand movement (hand movement amount) are classified based on PSF, which is created by the motion vector/hand movement function converting processor 32.

Figure 16:
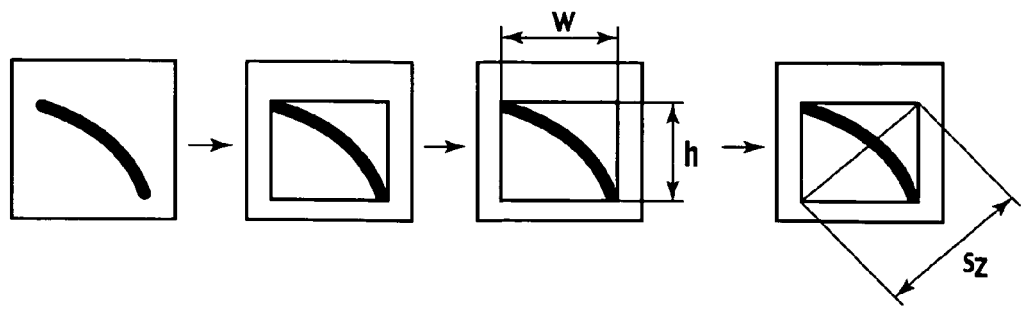
FIG. 16 is a schematic diagram for describing how to obtain hand movement amount [pixel].

By referring to FIG. 16, how to obtain a size of hand movement will be described. First, a circumscribed rectangle, which includes all of effective pixels (a pixel, a value of which is not 0) of PSF image, is obtained. Next, a length Sz [pixel] of a diagonal line is obtained based on the height h [pixel] and width w [pixel] of the circumscribed rectangle to be set to the size of hand movement (the hand movement amount).

Specifically, at Step S27, the size Sz of the hand movement (the hand movement amount) is obtained from PSF, and it is determined that the obtained size Sz of the hand movement is in which range of Sz≦Sth1, Sth1<Sz≦Sth2, and Sz>Sth2.

Here, Sth1 is a pre-determined threshold, Sth2 is a threshold Sthc or Stha, which is set by the above-described Step S22 or S23. It should be noted that a value of Sth1 is smaller than Sth2.

When the size Sz of the hand movement is determined as the range of Sth1<Sz≦Sth2, it is determined whether or not the flag F is set (F=1) (Step S28). When the flag F is set, that is, when the trajectory shape of the hand movement is determined as the straight line shape, the stabilization mode is set to the first mode (the mode to perform the image restoration process using the restoration filter, the ringing removing process, and the unsharp masking process) (Step S29). When the flag F is not set, that is, when the trajectory shape of the hand movement is determined as complicated shape, the stabilization mode is set to the third mode (the mode to perform no stabilization) (Step S30).

When the size Sz of the hand movement is determined as the range of Sz≦Sth1 at the above-described Step S27, the stabilization mode is set to the second mode (the mode to perform only the unsharp masking process) (Step S31). When the size Sz of the hand movement is determined as the range of Sz>Sth2 at the above-described Step S27, the stabilization mode is set to the third mode (the mode to perform no stabilization) (Step S30).

According to the above-described embodiments, when the size of the hand movement is larger than Sth2, the image stabilization is not performed and the blurred image (v_blur) per se is output. When the size of the hand movement is equal to or smaller than Sth1, the edge emphasizing process is performed by the unsharp masking processor 60 in relation to the blurred image (v_blur) to be output. When the size of the hand movement is larger than Sth1 and equal to or smaller than Sth2, and the trajectory shape of the hand movement is the complicated shape, the image stabilization is not performed, and the blurred image (v_blur) per se is output.

When the size of the hand movement is larger than Sth1 and equal to or smaller than Sth2, and the trajectory shape of the hand movement is the straight line shape, the image restoration process by the image restoration processor 40, the ringing removing process by the ringing removing processor 50, and the edge emphasizing process by the unsharp masking processor 60, are performed in relation to the blurred image (v_blur) to be output. In this case, when the speed change state of the motion vector is a uniform speed, the stabilization strength by the image restoration processor 40 is weakened, and at the same time the ringing removing strength by the ringing removing processor 50 is strengthened in comparison with the case where the speed change state of the motion vector is non-uniform speed.

In this manner, according to the above-described embodiments, an appropriate image stabilization mode can be performed according to the speed change state of the motion vector, the trajectory shape of the hand movement, and the size of the hand movement.

Other Embodiment

The present invention has been described in the above-described embodiments, but description and drawing, which constitutes this disclosure, should not be understood to limit the present invention. Various alternative embodiments, examples, and operational technologies are understood from the present invention to those who are in the art.

For example, the trajectory shape determination of the hand movement, which is performed at Step S24 in FIG. 11, may be omitted. In this case, process at Steps S25, S26, and S28 are also omitted. Therefore, at Step S27, when the size Sz of the hand movement is determined as the range of Sth1<Sz≦Sth2, the stabilization mode is set to the first mode.

In addition, the hand movement speed change state determination at Step S21 in FIG. 11 may be omitted without omitting the process at Step S24 in FIG. 11. It may further possible that the process at Step S24 in FIG. 11 as well as the hand movement speed change state determination at Step S21 in FIG. 11 may be omitted.

Further, in the above-described embodiments, the first mode includes the image restoration process, the ringing removing process, and the edge emphasizing process, but is not limited to these. Specifically, the first mode may include only the image restoration process and the ringing removing process, or only the image restoration process.

What is claimed is:

1. An image stabilizing device provided with an image restoration processor configured to perform an image restoration process for stabilizing hand movement deterioration included in an input image by using an image restoration filter based on hand movement information and provided with an edge emphasizing processor configured to perform an edge emphasizing process for emphasizing an edge of the input image, the image stabilizing device comprising:
a stabilization mode determiner configured to determine an image stabilization mode for stabilizing the input image based on a size of a hand movement created from the hand movement information, wherein the image stabilization mode includes a first mode for performing the image restoration process, a second mode for performing the edge emphasizing process, and a third mode for performing none of the image restoration process and the edge emphasizing process.

2. The image stabilizing device according to claim 1, wherein the first mode is the image stabilization mode for performing the edge emphasizing process after the image restoration process is performed, and the second mode is the image stabilization mode for performing the edge emphasizing process without performing the image restoration process.

3. The image stabilizing device according to claim 1, wherein the stabilization mode determiner determines the image stabilization mode based on trajectory information created from the hand movement information in addition to the size of the hand movement created from the hand movement information.

4. The image stabilizing device according to claim 1, wherein the stabilization mode determiner controls strength for stabilizing the hand movement by using the image restoration filter based on whether or not a speed change of the hand movement created from the hand movement information is uniform speed.

5. The image stabilizing device according to claim 1, further comprising: a ringing remover configured to perform a ringing removing process for removing ringing included in a stabilized image that is an image on which the hand movement is stabilized by the image restoration processor, wherein the first mode is the image stabilization mode for performing the ringing removing process after the image restoration process is performed, the third mode is the image stabilization mode for performing none of the image restoration process, the edge emphasizing process, and the ringing removing process, and the stabilization mode determiner controls strength for removing the ringing based on whether or not a speed change of the hand movement created from the hand movement information is uniform speed.

6. The image stabilizing device according to claim 1, wherein the stabilization mode determiner determines the image stabilization mode by comparing the size of the hand movement with a predetermined threshold, and controls the predetermined threshold based on whether or not a speed change of the hand movement created from the hand movement information is uniform speed.

* * * * *